Jan. 30, 1968  F. R. REID ET AL  3,366,191
METHOD AND APPARATUS FOR WEIGHING ARTICLES
Filed July 28, 1966  5 Sheets-Sheet 5

INVENTORS
FRANCIS R. REID
JAMES E. DRAPER
SELWYN JONES

*James V. Harmon*
ATTORNEY

3,366,191
METHOD AND APPARATUS FOR WEIGHING ARTICLES

Francis R. Reid, James E. Draper, and Selwyn Jones, Minneapolis, Minn., assignors to The Pillsbury Company, Minneapolis, Minn., a corporation of Delaware
Filed July 28, 1966, Ser. No. 568,479
10 Claims. (Cl. 177—210)

ABSTRACT OF THE DISCLOSURE

An article weight determining apparatus having a pivoted article supporting beam to which an elongated vibrating member (e.g. a wire) is connected at each end. A bridge circuit connected to each wire allows the counter EMF induced into the wire from a permanent magnet positioned adjacent to each wire to be sensed and used for starting and stopping a source of constant frequency pulses having a frequency substantially greater than the frequency of the vibrating wires. The pulses gated by the vibration of one wire through a predetermined number of cycles, for example one cycle is subtracted from the pulses gated by the other wire when passing through one cycle.

---

This invention relates to a method and apparatus for weighing articles and is more particularly directed to a method and apparatus for accurately, reliably and rapidly determining the weight of an article.

In one area of the prior art with which our invention is concerned, there is a requirement for successively determining the weight, or deviation of the weight from a standard weight, of a plurality of similar articles as they may be transferred from one location to another by means of a conveyor belt or the like. Apparatus of this type may be found in the manufacturing process of filling packages or containers with, for example, flour or other foodstuffs. In high speed operation, it is not uncommon to obtain production capacities in excess of three hundred units per hour. The weighing of each of the units, or articles, must therefore be accomplished in a very short time. Under any conditions of operation, accuracy is of utmost importance and tolerance requirements of greater than one part per thousand are desirable to provide maximum efficiency of the manufacturing process.

Prior art weighing apparatus has failed to provide the accuracy, reliability and high speed operation required under present day manufacturing and processing operations. In general, accuracy and reliability may be attained but only at the expense of speed.

Our invention provides an improved article weighing method and apparatus in which the resonant frequency of a force responsive variable vibrating element in an oscillator is used as a continuously operative oscillatory weight sensing device in combination with an article receiving mounting means and apparatus for measuring the frequency of the oscillator means. This method and apparatus will provide a high degree of accuracy and reliability for high speed operation.

It is therefore an object of our invention to provide an improved method of weighing articles.

It is a still further object of our invention to provide an improved apparatus for weighing articles.

A further object of our invention is to provide an improved method and apparatus of high speed and accuracy for weighing articles.

Another object of our invention is to provide an improved vibratory force responsive method and apparatus for weighing articles.

A further object of our invention is to provide an improved method and weighing apparatus which may be operative under large variations in ambient conditions.

Another object of our invention is to provide an improved method and apparatus for determining the weight of an article in which a force proportional to the weight of an article is momentarily and differentially applied to a pair of continuously oscillating members.

These and other objects of our invention will become apparent from a consideration of the appended specification, claims and drawings, in which:

FIGURE 1 is an electrical schematic and block diagrammatic representation of one embodiment illustrating the method and apparatus of our invention.

FIGURE 8 is an enlarged sectional view of a portion of FIGURE 7 taken along section line 8—8.

Referring now to FIGURE 1 of the drawings, there is shown a weight determining or scale portion indicated generally by reference character 10 and suitable apparatus for computing a signal proportional to the weight of an article from signals provided by scale 10. Scale 10 is diagrammatically shown including a stationarily disposed platform 12 having a centrally disposed upwardly extending column, or bearing plate 14 which cooperates with a similar plate 16 to be described in connection with FIGURES 3-7. A beam member 18 is shown pivotally disposed on top of column member 14. A variable vibrating means 56 is shown connected intermediate the right ends of base member 12 and beam member 18 respectively which, together with an amplifier means 112, comprises an oscillator means operative at the resonant frequency of the vibrating means 56 when connected in the manner shown and energized from a suitable source of electrical energy (not shown). A pair of input conductors 112a connected to amplifier 112 are shown wired to a pair of output terminals on a Wheatstone bridge comprised of resistors R1, R2, R3 and vibrating means such as a wire conductor 56 indicated as R$x$. The output of the amplifier 112 is shown connected in regenerative relationship with the wire 56 through conductors 112b.

In a similar manner, a vibrating means such as a wire 54 (R$y$) is shown connected intermediate the left ends of base member 12 and beam member 18 and forms, in combination with an amplifier 110, an oscillator means that is adapted to operate at a frequency corresponding to the resonant frequency of the wire. A similar Wheatstone bridge is shown connected to input conductors 110a of amplifier 110 and comprises resistors R1, R2, R3 and R$y$ (corresponding to vibrating means 54). The output terminals of the amplifier 110 are connected in regenerative relationship with vibrating means 54 through conductors 110b.

Figures 3, 4:
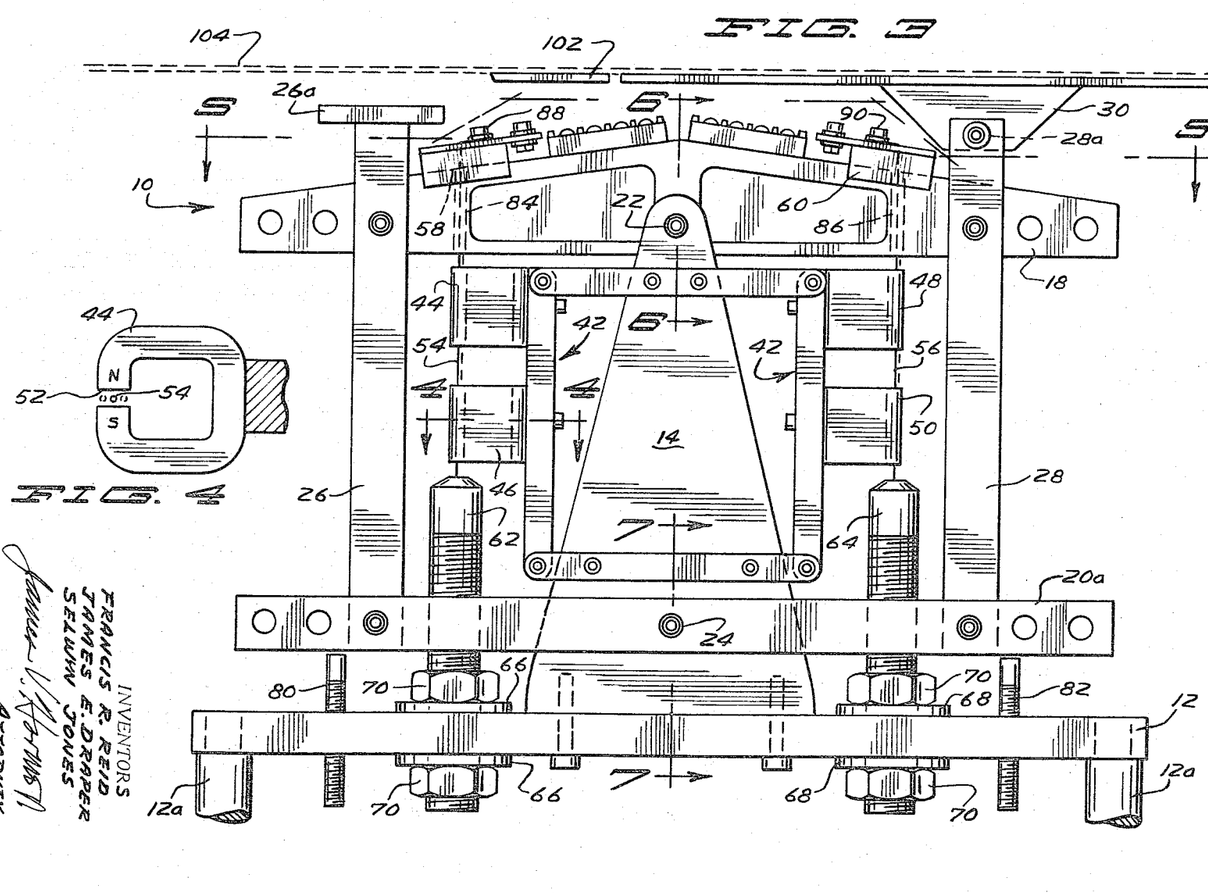
FIGURE 4 is a sectional view of a portion of FIGURE 3 taken along section line 4—4.
Figure 5:
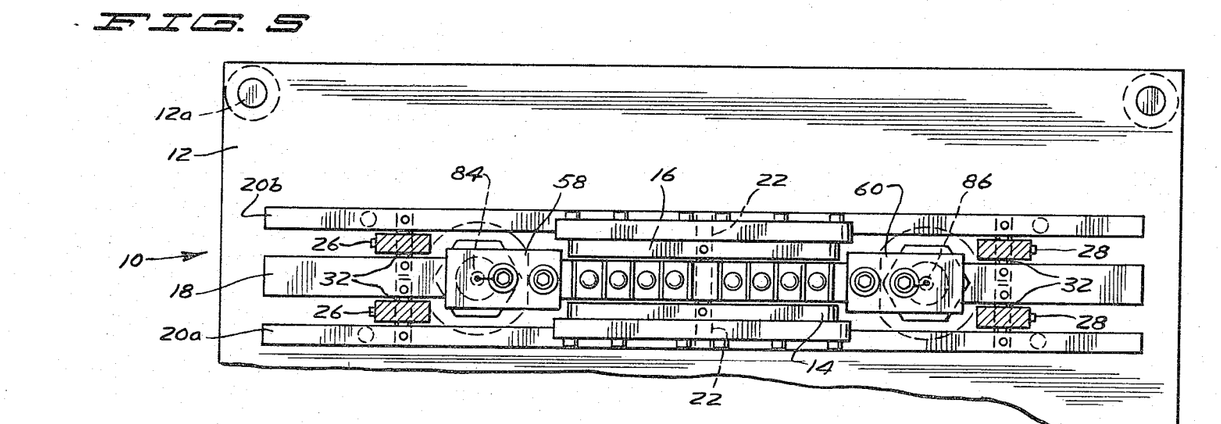
FIGURE 5 is a portion of the apparatus shown in FIGURE 3 taken along section line 5—5.
Figure 6:
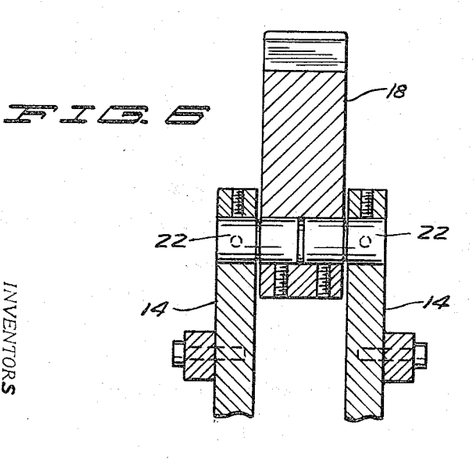
FIGURE 6 is an enlarged sectional view of a portion of FIGURE 3 taken along section line 6—6.
Figure 7:
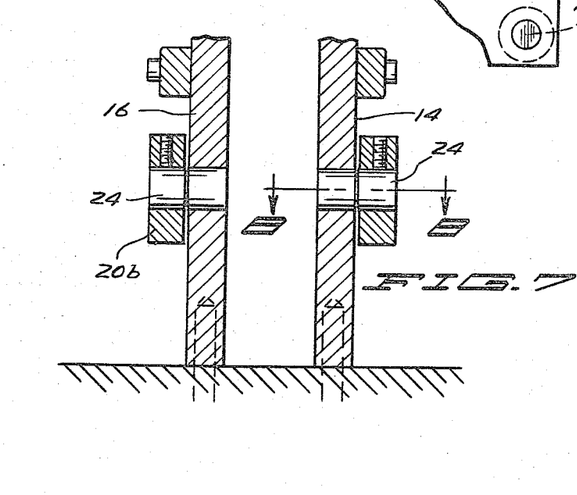
FIGURE 7 is an enlarged sectional view of a portion of FIGURE 3 taken along section line 7—7.

The vibrating means 54 and 56 may be comprised of suitable conductive elastic members, for example, piano wire or the like which, when suitably energized, will vibrate in a transverse mode when placed in a magnetic field provided by permanent magnet devices 44 and 46 and 48 and 50 respectively. A plan view of one of the magnetic energy devices is shown in FIGURE 4 in which the vibrating means or wire 54 is shown disposed in a gap 52 provided in a permanent magnetic structure indicated by reference character 44.

It may thus be seen that the scale 10 is comprised of a pair of substantially identical oscillator means indicated by numerals 112 and 124, each having a vibrating means adapted to oscillate at a natural resonant frequency determined by the elastic characteristics thereof, and a longitudinal force provided by suitable biasing means. The individual vibrating means 54 and 56 are adapted to be differentially stressed when the center portion of beam member 18 is rotated about the pivot formed at the top of the upstanding column member 14.

The output of the amplifier 110 in oscillator 122 is shown connected to the input terminals of amplifier 126 through conductors 114 and 116 respectively. The output of amplifier 112 in oscillator 124 is shown connected to amplifier 137 through conductors 118 and 120 respectively. The frequency of the signals appearing at the outputs of amplifiers 126 and 137 will be that of oscillators 122 and 124 respectively, as determined by the resonant frequency of operation of vibrating means 54 and 56 respectively.

The difference in frequency between the signals appearing at amplifiers 126 and 137 represents twice the frequency difference that would be observed, for example, as will be described in connection with the apparatus shown in FIGURES 9 and 10 which utilizes a single oscillating system due to the effect of a force proportional to the weight of an article that is applied longitudinally of the vibrating means to thereby change its resonant frequency.

A novel and improved apparatus and method of determining the frequency difference between the two signals is contained in frequency determining apparatus 300 shown in FIGURE 1 of the drawings. Frequency determining apparatus 300 is connected to the outputs of amplifiers 126 and 137 through suitable connectors, to a display device 166 for displaying a determination of the difference between the weight of an article and a reference weight supported upon platform 26a, through conductor 165, to the article sensing device shown in the form of a photo cell 119 on FIGURE 2 of the drawings through conductor 171 and to a suitable recording apparatus (not shown) through conductor 302. Frequency determining apparatus 300 includes an oscillator 156 which may preferably be adapted to provide an output signal on the order of $10^6$ cycles per second and which may consist of a train of pulses of suitable polarity. Oscillator 156 is connected to a counter 164 which may preferably be of the type known to those skilled in the art as a reversing decades counter which is provided with at least one output terminal at which appears a signal proportional to the difference in frequency of a pair of signals applied to a corresponding pair of input terminals which are indicated by the polarity signs, + and − respectively on the drawing. Counter 164 also includes reset input terminal provided for connection to a reset generator.

Oscillator 156 is connected to counter 164 through conductor 155, signal gating device 154, conductor 157 connected in parallel to input terminals on "and" gates 158 and 159 and to + and − terminals through conductors 162 and 163 respectively. Gate 154 includes a further control input terminal connected through conductor 153 to an "and" inhibit gate 152 that is in turn connected to an output terminal on flip-flop devices 128 and 139 through conductors 150 and 151 respectively. The output terminal on flip-flop 128 is also connected to "and" gate 158 through conductor 160 and the output terminal of flip-flop 139 is connected to an input terminal on "and" gate 159 through conductor 161.

One input terminal on flip-flop 128 is connected to the output of amplifier 126 through conductor 127. A further input terminal on flip-flop 128 is connected to reset gate 135 which is in turn connected to a reset generator 170 through conductor 136 and to amplifier 126 through selective switching means 130 and at least one of the frequency dividing devices, conductor 129 and divider 133. In a similar manner, flip-flop 139 has an input terminal connected to the output of amplifier 137 through conductor 138 and a further input terminal connected through reset gate 148 to reset generator 170 through conductor 136 and to amplifier 137 through selective switching means 142 through one of the several frequency dividing devices, conductor 141 and divider 140, conductor 145 and divider 143 or conductor 147 and divider 146.

Reset signal generator 170 is connected through conductor 171 to photo cell censor 119. Display device 166 is connected to reset generator 170 through conductor 168 and conductor 136.

Counter 164 is also shown provided with an output terminal that may be connected to a suitable recording means (not shown) through conductor 302 to provide either a display or a permanent continuous record of the articles in process.

"And" inhibit gate 152 is operative to open gate 154 when a signal is applied to one or the other of its input terminals through conductors 150 and 151 and to inhibit gate 154 when a signal is present or absent simultaneously on conductors 150 and 151. Flip-flop devices 128 and 139 are operative to provide an output signal on conductors 150 and 151 upon initial application of a signal of a predetermined magnitude to the respective input terminals connected to conductors 127 and 138 and to remove such output signal upon application of a signal of predetermined magnitude to the respective input reset terminals connected to reset gates 135 and 148.

Figure 2:
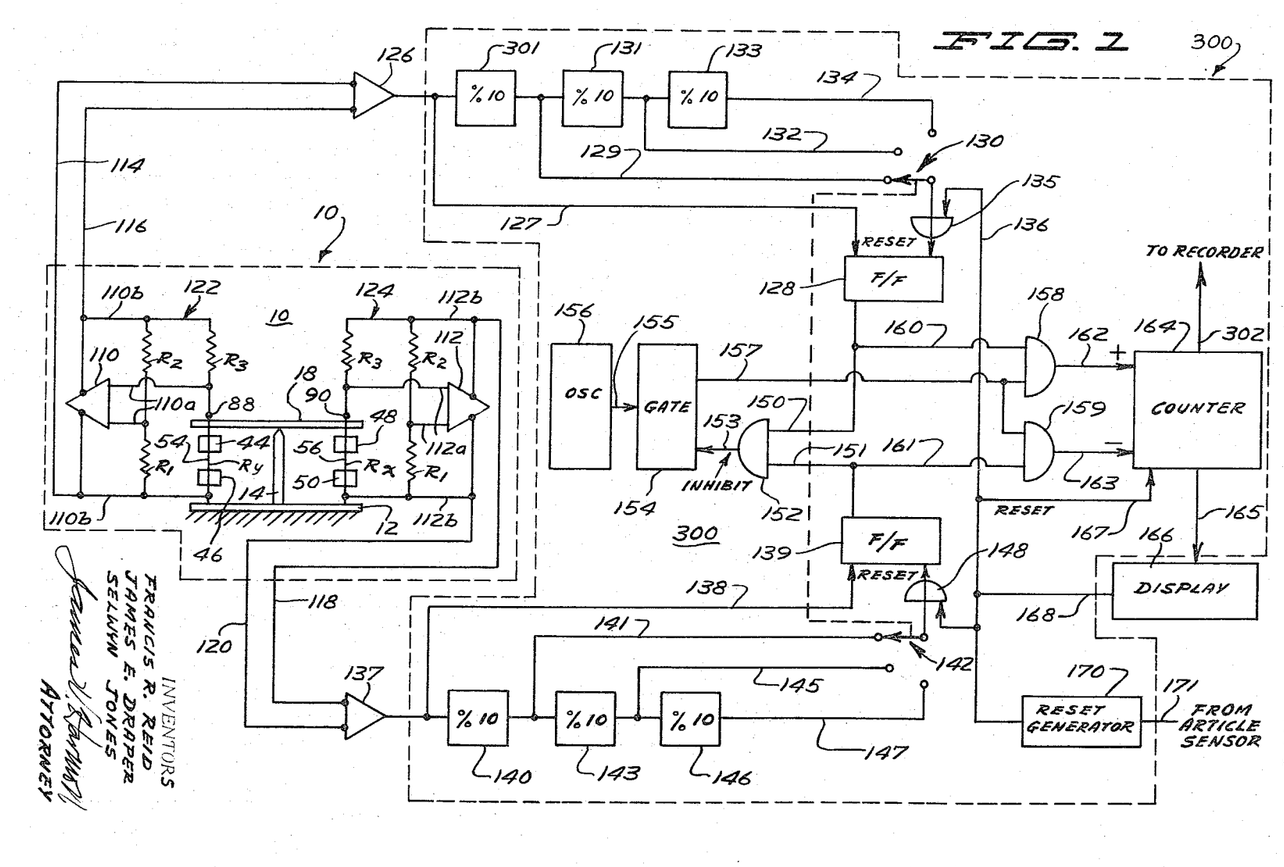
FIGURE 2 is a perspective view illustrating the application of the embodiment of FIGURE 1 in combination with a conventional article conveying machine.

Referring now to FIGURE 2 of the drawing, there is shown a perspective sketch of a high speed conveying device which is illustrated in combination with a further embodiment of our invention incorporating the principles described above with reference to FIGURES 9 and 10 of the drawing.

In FIGURE 2 a generally horizontal stationary support member is indicated by reference character 103 and is utilized to support a conveyor slide member 102 in a generally horizontal position. Conveyor slide member 102 has downwardly curved portions 106 and 108 at its left and right ends respectively. A further stationary base member 107 is shown disposed below conveyor slide member 102 and forms a support for a downwardly depending drive assembly including drive drum 110 and idler drum 112. Drive drum 110 may be connected to a suitable source of motive power (not shown). A continuous belt member 104 is shown disposed on top of conveyor slide member 102 and suitably threaded through drive drum 110 and take-up drum 112 in a manner well known to those skilled in the art. Platform 107 is also shown supporting a scale or weight determining apparatus indicated generally by reference character 10 and which is disposed within a suitable protective covering 100. Scale 10 is supported by a plurality of column members indicated by reference character 12a. Also supported on platform member 107 is a photocell 119 that is disposed to coact with a source of energy 116 shown mounted on base member 103 in cooperating relationship whereby interruption of source of energy 116 by the progressive movement of articles 114 with respect thereto will provide a suitable signal for purposes to be explained below. A vertically movable plate or platform 30 is shown disposed in an opening intermediate the ends of conveyor slide member 102 and is connected to scale 10 through suitable connecting means 28. It may now be apparent to those skilled in the art that the scale indicated generally by reference character 10 on FIGURE 2 of the drawings may also be comprised of the apparatus shown in FIGURES 9 and 10 of the drawing in which case the scale is indicated generally by reference character 212. The description of the operation of the apparatus of FIGURE 2 is set forth below in connection with the detailed description of the embodiment of FIGURES 1, 3, 5, 6, 7 and 8.

Initially, the frequency determining apparatus 300 may be in any condition. Upon receipt of a signal from photocell 119 through conductor 171 to reset generator 170, a reset signal is supplied through conductor 136 to reset counter 164 and display 166 to a zero condition through conductors 167 and 168 and to reset gates 135 and 148 respectively. At this time flip-flop devices 128 and 139 will have an output of, for example, zero. Gate 154 will be open but "and" gates 158 and 159 will be closed. Flip-flops 128 and 139 are further assumed to respond, as indicated above, to a positive input signal of predetermined magnitude to provide a + or "1" output. For the purposes of illustration, it will be assumed that the signal of unknown frequency appearing at the output of amplifier 126 is the first to reach a positive predetermined amplitude to trigger flip-flop 128 to provide a "1" or positive signal. This provides an output signal through conductor 150 to "and" inhibit gate 152 to open gate 154 and simultaneously provides an input to one terminal of "and" gate 158 to allow pulses from oscillator 156 to pass to the + terminal on counter 164. This continues for a time dependent upon the frequency of the signal appearing at the output of amplifier 137. When this signal reaches a predetermined amplitude, it causes flip-flop 139 to provide a "1" positve output to be applied to "and" inhibit gate 152 through conductor 151 and a further signal to one input terminal of "and" gate 159. The simultaneous application of the "1" signals from flip-flops 128 and 139 to "and" inhibit gate 152 serves to close gate 154. Thus there are no signals applied to either the + or − input terminals of counter 164. A predetermined time interval later measured by the frequency of the signal appearing at the output of amplifier 126 and dependent upon the position of switch means 130, the first positive going pulse supplied to reset gate 135 which exceeds the predetermined magnitude will reset flip-flop 128 to its normal state. This removes one signal from "and" inhibit gate 152 and further removes the input signal from one of the input terminals on "and" gate 158. At this time, gate 154 is opened and pulses are applied to the negative input terminal on counter 164 through conductor 157, "and" gate 159 and conductor 163. The pulses will be supplied to counter 164 until such time as the first positive going pulse from the output of amplifier 137 exceeds a predetermined amplitude to reset flip-flop 139 through reset gate 148. This serves to simultaneously inhibit or close gate 152 and to turn off "and" gate 159 by removal of the signal previously applied from the output terminal of flip-flop 139 through conductor 161. Thus, it may be seen that the frequency of oscillation of one of the oscillator means is subtracted from the frequency of oscillation of the other oscillator means and a frequency difference equal to twice the frequency of the change, F, of each of the oscillator means 122 and 124 will be determined to double the resolution and thereby the accuracy of the weight determination.

It should be noted that the effect of ambient conditions, particularly with respect to temperature and transient vibrations from outside sources, will affect each of the vibrating means 54 and 56 in substantially the same manner and because the apparatus is operative to compare the frequencies of each of the oscillator means, the errors that might have been introduced by such ambient conditions will be cancelled or eliminated. In the illustrative embodiment, the resultant difference in frequency of operation of oscillators 122 and 124 will be the same.

Figure 9:
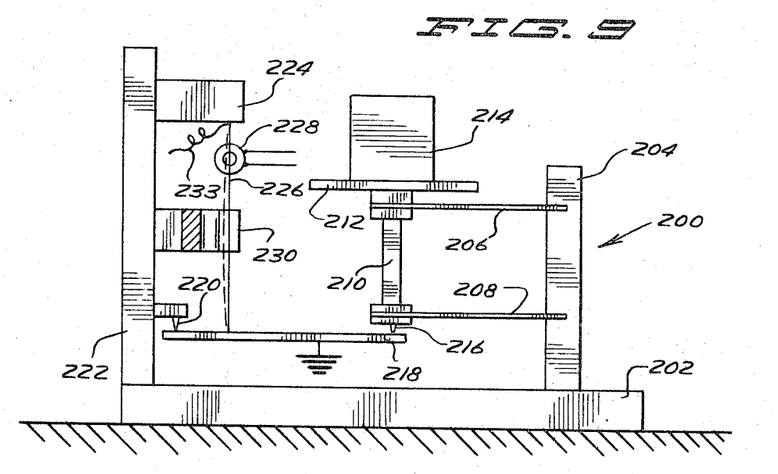
FIGURE 9 is a side elevational view of a further embodiment of the invention and FIGURE 10 is an electrical schematic and block diagram of the apparatus to be used in connection with the embodiment of FIGURE 9.
Figure 10:
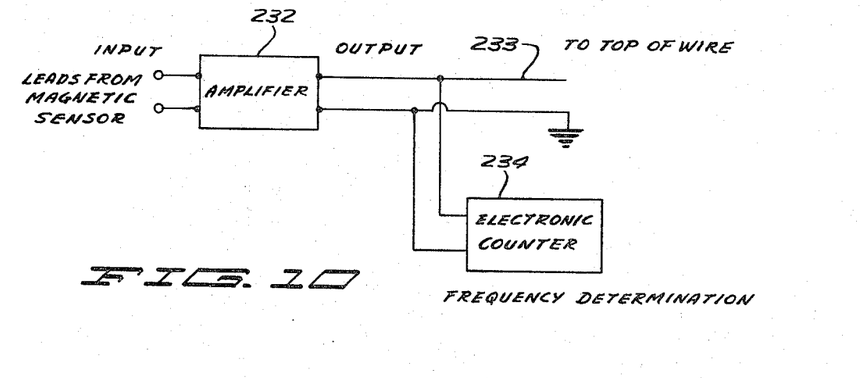

FIGURES 3, 4, 5, 6, 7 and 8 illustrate a specific weight determination mechanism that incorporates the principles set forth in the above description of operation of FIGURE 1 of the drawings and, as such, further includes the principles illustrated in FIGURES 9 and 10 of the drawings.

In FIGURES 3, 4, 5, 6, 7 and 8 it will be seen that the plate member 12 is adapted to be stationarily disposed on, for example, a platform 107 (FIGURE 2) through column, or leg members 12a. The bearing plate 14 cooperates with a similar bearing plate 16 to form parallel upwardly extending columns which include vertically spaced pivots 22 and 24. The laterally extending beam members 18 is shown pivotally disposed, at its center, and between bearing plates 14 and 16, on pivot 22 and a pair of lower beams 20a and 20b are shown laterally disposed outwardly of bearing plates 14 and 16 and pivoted at the center portion thereof on bearing, or pivot 24 extending horizontally and laterally therethrough. A parallelogram type linkage intermediate upper beam 18 and lower beams 20a and 20b is formed by pivotally connecting left vertically disposed link 26 and right vertically disposed link 28 through suitable corresponding pivot members 32 extending through the beams.

While the operation of the vibrating means serves to substantially reduce static friction, the type of pivot shown in FIGURE 8 may be used to further reduce such friction to a minimum amount. In FIGURE 8, a sectional representation of a "crossed reed" pivot is shown in which one or more radially extending elastic members extend between longitudinally extending members 36. Members 36 are further secured to coaxial sleeve members 38 and 40 which are in turn disposed in the members, e.g. 20b and 20a respectively, and are intended to rotate or pivot relative to each other.

Figures 2, 3:
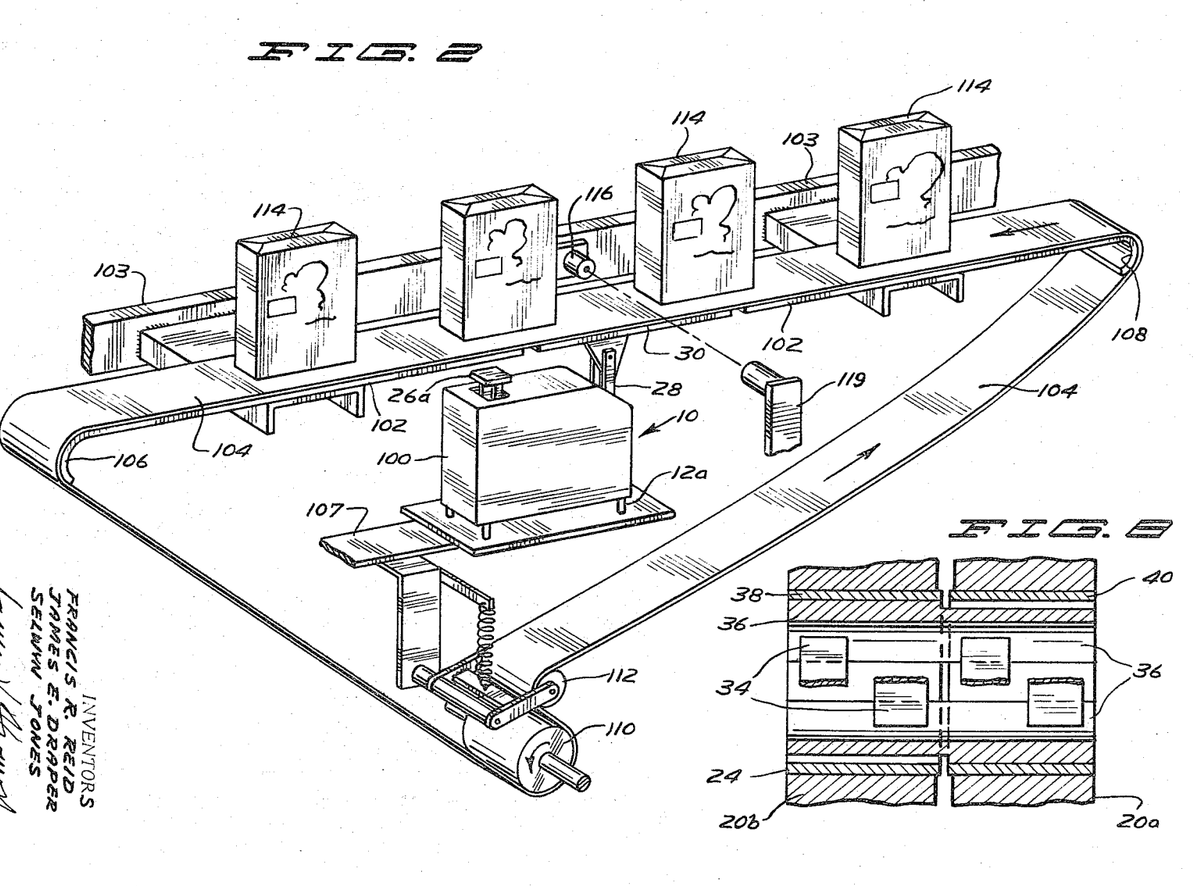
FIGURE 3 is a detailed side elevational view illustrating the mechanical relationships of the several elements of an embodiment of a portion of the apparatus shown in FIGURES 1 and 2.

The upper end of connecting link 26 is provided with a platform member 26a that is adapted to receive a standard weight of predetermined magnitude which is preferably similar in magnitude to the article to be weighed. An article receiving platform 30 is stationarily mounted on the upper end of link 28 by fastening means 28a and is adapted to retain a parallel disposition with respect to conveyor slide 102.

The vibrating elements 54 and 56 are shown generally vertically disposed intermediate base member 12 and substantially equally laterally spaced positions opposite the center of the upper beam member 18. The vibrating means 54 is shown connected at its lower end to a tension adjusting screw member 62 and at its upper end to a bracket means on beam 18, indicated by reference character 58. A suitable insulated aperture 84 extends vertically through the left side of upper beam member 18 and an insulated terminal 88 is operatively connected to the top end of member 54. Suitable screw threaded adusting means 70, including insulated washer means 66 are shown disposed on the top and bottom of base member 12 to provide an adjustable biasing means for vibrating means 54. In a similar manner vibrating means 56 is shown disposed intermediate the top end of screw threaded member 64 and bracket member 60 disposed on the right side of upper beam member 18 through aperture 86. A terminal 90 is provided for electrical connection to, for example, the circuitry shown in FIGURE 1. Tension adjusting screw 64 is likewise provided with a pair of screw threaded members 70 and a pair of insulated washer members 68.

Further shown extending upwardly from base member 12 and adapted to engage lower beam member 20a are a pair of adjustable threaded stop members 80 and 82 disposed on the left and right hand ends respectively. The parallelogram linkage assembly including upper beam member 18 and lower beam members 20a and 20b is preferably restricted to rotational movement about bearing members 22 and 24 in plate members 14 and 16 to a relatively small arcuate movement.

The sources of magnetic energy 44 and 46 and 48 and 50 adapted to cooperate with vibrating means 54 and 56 respectively are shown adjustably mounted on a mounting means indicated generally by the reference character 42 which is fixedly disposed on upwardly extending plate members 14 and 16. It has been noted that with one source of magnetic energy for each vibrating means, vibratory motion at a fundamental resonant frequency is obtained. Further, by the addition of suitably polarized magnets, the vibrating means may be forced to vibrate at a given harmonic frequency of such fundamental frequency. At higher frequencies, it is possible to provide an oscillatory signal having a steeper wave form thereby making possible more accurate triggering of frequency determining apparatus and a corresponding increase in accuracy of the weight determining apparatus. Moreover, higher frequencies permit counting over a greater number of periods of oscillation in a given time thereby insuring more accurate frequency determination by dividing the trigger error over a larger number of oscillations.

From a consideration of the above description in connection with FIGURES 1–8 of the drawings, it will be seen that a complete method and apparatus for determining the weight of articles in a manufacturing process is disclosed. To briefly review the principles of operation, first and second oscillator means including vibrating means are operatively and differentially connected to an article receiving means that is adapted to differentially apply a force (stress) proportional to the weight of the article to the vibrating means. The vibrating means are continuously operative to oscillate at their respective resonant frequencies in response to biasing forces supplied thereto from a suitable mounting means and from the differential weight responsive biasing means, to provide first and second frequencies of operation, the difference of which is proportional to the weight of an article. Further, the oscillator means mutually responsive to transient ambient condition variations to cancel out such variations and present a pair of signals which may be compared to provide an accurate representation of the weight of the article.

The theory of operation will be briefly described. It is desired to sense the counter EMF generated in the wires 54 and 56 rather than the voltage which is applied by the amplifier. This is accomplished by the bridge circuit in accordance with the following formula where CEMF is the counter EMF generated in the wire and the EMF sensed at the input of the amplifier 110 or 112 is designated E. Then summing voltages around the bridge:

$$E_s = -\left(\frac{R_2}{R_1+R_2} \times V\right) + CEMF + \frac{R_y}{R_y+R_3} \times (V-CEMF)$$

As in all bridge circuits of the type described used for sensing purposes, the resistances should have predetermined values for best operation. If the two fractional values in the above equation are made equal to each other they cancel out of the equation. The equation then becomes:

$$E_s = CEMF = \left(1 - \frac{R_y}{R_y+R_3}\right)$$

From this equation it can be seen that CEMF can be read directly if the resistance ($R_y$) of the wire 54 is made small compared to $R_3$. In other words, the equation is reduced to:

$$E_s = CEMF$$

In this way the counter EMF is sensed using the bridge circuit.

Referring now to FIGURES 9 and 10 of the drawing, our invention is shown embodied in a relatively simple weight determining apparatus comprising an electromechanical device indicated generally by reference character 200 in FIGURE 9 to be used in combination with the electronic apparatus shown diagrammatically and schematically in FIGURE 10.

In FIGURE 9 there is shown a base member 202 having a pair of laterally disposed upright column members 204 and 222 which are preferably rigidly attached to base member 202. An article supporting platform 212 is shown disposed on the top of, and operatively connected to a vertically movable downwardly extending column member 210 having a downwardly extending pivot member 216 at its lower end. Column 210 is shown resiliently connected to column member 204 through spring leaf members 206 and 208 so as to allow freedom of motion of column 210 in a vertical direction. An article to be weighed is shown disposed on top of platform member 212 and is indicated by reference character 214.

A vibrating means 226 shown in the form of a longitudinally elongated conductive wire which is preferably comprised of material exhibiting elastic characteristics, is connected to an insulating support means 224 at its upper end and to a generally horizontally disposed lever arm 218 at its lower end. A source of magnetic energy 230 is shown mounted on upwardly extending column 222 in magnetic energy transferring relationship with member 226 and a further oscillation responsive signal generating means 228 is shown disposed in operative relationship with respect to member 226. Signal generating means may be, for example, a tape recording head. The right end of lever arm 218 is shown disposed on pivot 216 on the lower part of column 210 and the left end is disposed on a further pivot 220 which is suitably mounted on upright column 222. Lever arm 218 is also shown connected to an electrical ground.

In FIGURE 10 an amplifier 232 is shown having a pair of input terminals adapted to be connected to oscillation responsive signal generating means 228 through suitable conductors and having a pair of output terminals adapted to be connected intermediate a ground terminal and to the top end of member 226 through conductor 233. An electronic counter adapted to determine and display the frequency of the output of amplifier 232 is also shown connected to the output terminals thereon.

It may thus be seen that amplifier 232, oscillating member 226, source of magnetic energy 230 and oscillation responsive signal generating means 228 comprise an oscillator means, the frequency of which is determined by the resonant frequency of oscillation member 226. It has been noted that the resonant frequency of member 226 is determined by its elastic characteristics which are influenced by longitudinal forces applied thereto and that change of such forces results in a corresponding change in resonant frequency of oscillation of member 226.

In the operation of the apparatus shown in FIGURES 9 and 10, it may first be assumed that article 214 is removed from platform 212 and that member 226 is free to oscillate at a given resonant frequency in the oscillator means of which it forms the frequency determining element. This frequency may be noted for purposes of calibration or comparison.

Following the placing of a weight or article 214 on platform 212 column 210 applies a downward force, proportional to the weight of the article, through pivot 216 to the right end of lever arm 218 which in turn provides an increased biasing force on member 226 as lever arm 218 rotates about stationary pivot 220 on upright column 222. This force will increase the tension on member 226 and provide a corresponding increase in resonant frequency of oscillation of member 226 and thereby an increase in frequency of the signal appearing at the output terminals of amplifier 232. The resulting increase in frequency may be sensed and displayed by electronic counter 234 and a comparison of the two frequencies provides an indication of the weight of article 214.

It is apparent that many modifications and variations of this invention as hereinbefore set forth may be made without departing from the spirit and scope thereof. The specific embodiments described are given by way of example only and the invention is limited only by the terms of the appended claims.

We claim:
1. Article weight determining apparatus comprising in combination:
   (a) oscillator means including a source of energy therefor, an output terminal, and vibrating means, said vibrating means being comprised of material exhibiting elastic characteristics and operative to oscillate at a variable resonant frequency in accordance with the magnitude of forces applied thereto;
   (b) mounting means supporting said vibrating means, said mounting means including means for receiving an article to be weighed and applying a force proportional to the weight of said article to said vibrating means;
   (c) frequency determining means connected to the output terminal on said oscillator means, and
   (d) a pair of oscillator means, the mounting means including means for differentially applying a force proportional to the weight of an article to the vibrating means in the oscillator means and the frequency determining means includes means for comparing the frequency of each of the oscillator means.

2. The apparatus of claim 1 in which vibrating means in each of the oscillator means includes a longitudinally elongated member connected at each end to the mounting means and a source of magnetic energy is disposed in magnetic energy transferring relationship to said elongated member.

3. The apparatus of claim 2 in which each of the oscillator means includes amplifier means having output terminals connected in regenerative relationship with the vibrating means and input terminals connected to the vibrating means through circuit means operative to provide an input signal proportional to the counter electromotive current present in said variable frequency determining means.

4. Article weight determining apparatus comprising in combination:
   (a) oscillator means including a source of energy therefor, an output terminal, and vibrating means, said vibrating means being comprised of material exhibiting elastic characteristics and operative to oscillate at a variable resonant frequency in accordance with the magnitude of forces applied thereto;
   (b) mounting means supporting said vibrating means, said mounting means including means for receiving an article to be weighed and applying a force proportional to the weight of said article to said vibrating means;
   (c) frequency determining means connected to the output terminal on said oscillator means, and,
   (d) the variable vibrating means including a longitudinally elongated member connected at each end to the mounting means, an electrical connection between the elongated member and the frequency determining means and a source of magnetic energy is disposed in magnetic energy transferring relationship to said elongated member.

5. The apparatus of claim 4 in which the oscillator means includes amplifier means having output terminals connected in regenerative relationship with the vibrating means and input terminals connected to the vibrating means through circuit means operative to provide an input signal proportional to the counter electromotive current present in said vibrating means.

6. Article weight determining apparatus comprising in combination:
   (a) oscillator means including a source of energy therefor, an output terminal, and vibrating means, said vibrating means being comprised of material exhibiting elastic characteristics and operative to oscillate at a variable resonant frequency in accordance with the magnitude of forces applied thereto;
   (b) mounting means supporting said vibrating means, said mounting means including means for receiving an article to be weighed and applying a force proportional to the weight of said article to said vibrating means;
   (c) frequency determining means connected to the output terminal on said oscillator means, and
   (d) vibrating means including a source of constant frequency pulses having a frequency substantially higher than the frequency of the oscillator means and a gate means connected to said source of pulses operative in response to a predetermined number of cycles of the output of the oscillator means to provide an output to a pulse counting means.

7. Article weight determining apparatus comprising in combination:
   (a) a pair of oscillator means each including a source of energy therefor, an output terminal, and vibrating means, said vibrating means being comprised of material exhibiting elastic characteristics and operative to oscillate at a variable resonant frequency in accordance with the magnitude of forces applied thereto;
   (b) mounting means supporting said vibrating means, said mounting means including means for receiving an article to be weighed and applying a force proportional to the weight of said article to said vibrating means;
   (c) frequency determining means connected to the output terminal on said oscillator means,
   (d) the mounting means including means for differentially applying a force proportional to the weight of an article to the vibrating means of the oscillator means and the frequency determining means including means for comparing the frequencies of the oscillator means,
   (e) said frequency determining means including a source of constant frequency pulses having a frequency substantially greater than the frequency of the oscillator means,
   (f) a counting means,
   (g) a gate means connected intermediate said source of pulses and said counting means,
   (h) said counting means being operative in response to a predetermined number of cycles of the output of each of the oscillator means to provide an output that is the algebraic sum of the frequencies of the oscillator means.

8. The apparatus of claim 7 in combination with an article conveying means for successively applying the weight of an article to the vibrating means and sensing means being controllably connected to the gate means for initiating the operation of the gate means when the weight of the article is applied to the vibrating means.

9. Article weight determining apparatus comprising in combination:
   (a) a pair of oscillator means each including a source of energy therefor, an output terminal, and vibrating means, said vibrating means being comprised of material exhibiting elastic characteristics and operative to oscillate at a variable resonant frequency in accordance with the magnitude of forces applied thereto;
   (b) mounting means supporting said vibrating means, said mounting means including means for receiving an article to be weighed and applying a force proportional to the weight of said article to said vibrating means;
   (c) frequency determining means connected to the output terminal on said oscillator means;
   (d) the mounting means including means for differentially applying a force proportional to the weight of an article to the vibrating means of the oscillator means and the frequency determining means includes means for comparing the frequencies of the oscillator means;
   (e) each said vibrating means including a longitudinally elongated member connected at each end to the mounting means;

(f) a source of magnetic energy disposed in magnetic energy transferring relationship to said elongated member,
(g) the frequency determining means including a source of constant frequency pulses having a frequency substantially greater than the frequency of the oscillator means.
(h) a counting means,
(i) a gate means connected intermediate said source of pulses and said counting means,
(j) said counting means being operative in response to a predetermined number of cycles of the output of each of the oscillator means to provide an output that is the algebraic sum of the frequencies of the oscillator means.

10. Article weight determining apparatus comprising in combination:
(a) a pair of oscillator means each including a source of energy therefor, an output terminal, and vibrating means, said vibrating means being comprised of material exhibiting elastic characteristics and operative to oscillate at a variable resonant frequency in accordance with the magnitude of forces applied thereto;
(b) mounting means supporting said vibrating means, said mounting means including means for receiving an article to be weighed and applying a force proportional to the weight of said article to said vibrating means;
(c) frequency determining means connected to the output terminal on said oscillator means;
(d) the mounting means including means for differentially applying a force proportional to the weight of an article to the vibrating means of the oscillator means and the frequency determining means includes means for comparing the frequencies of the oscillator means;
(e) each said vibrating means including a longitudinally elongated member connected at each end to the mounting means;
(f) a source of magnetic energy disposed in magnetic energy transferring relationship with said elongated member;
(g) the frequency determining means including a source of constant frequency pulses having a frequency substantially greater than the frequency of the oscillator means,
(h) a counting means,
(i) gate means connected intermediate said source of pulses and said counting means,
(j) said counting means being operatively responsed to a predetermined number of cycles of the output of each of the oscillator means to provide an output that is the algebraic sum of the frequencies of the oscillator means;
(k) an article conveying means for successively applying the weight of an article to the vibrating means and
(l) sensing means controllably connected to the gate means for initiating the operation of the gate means when the weight of the article is applied to the vibrating means.

References Cited

UNITED STATES PATENTS

| | | | |
|---|---|---|---|
| 2,694,310 | 11/1954 | Pounds | 177—210 X |
| 3,186,504 | 6/1965 | Wilgen | 177—210 |

FOREIGN PATENTS

| | | |
|---|---|---|
| 685,598 | 5/1964 | Canada. |
| 622,581 | 12/1935 | Germany. |
| 488,921 | 7/1938 | Great Britain. |

RICHARD B. WILKINSON, *Primary Examiner.*

G. H. MILLER, JR., *Assistant Examiner.*